United States Patent [19]

Acampora

[11] 4,381,562
[45] Apr. 26, 1983

[54] BROADCAST TYPE SATELLITE COMMUNICATION SYSTEMS

[75] Inventor: Anthony Acampora, Freehold, N.J.

[73] Assignee: Bell Telephone Laboratories, Incorporated, Murray Hill, N.J.

[21] Appl. No.: 145,618

[22] Filed: May 1, 1980

[51] Int. Cl.³ .............................................. H04J 3/06
[52] U.S. Cl. ........................................ 370/97; 370/75; 455/12
[58] Field of Search ....................... 370/97, 75, 104, 95; 455/12, 13

[56] References Cited

U.S. PATENT DOCUMENTS

| | | | |
|---|---|---|---|
| 3,810,255 | 5/1974 | Wachs et al. | 455/13 |
| 4,016,494 | 4/1977 | Moll | 455/12 |
| 4,144,495 | 3/1979 | Metzger | 455/12 |
| 4,160,128 | 7/1979 | Texier | 370/84 |
| 4,163,235 | 7/1979 | Schultz | 455/12 |
| 4,181,886 | 1/1980 | Cooperman | 455/12 |
| 4,232,266 | 11/1980 | Acampora | 370/97 |
| 4,259,741 | 3/1981 | Kawai | 370/75 |

OTHER PUBLICATIONS

"Technology Considerations for the Use of Multiple Beam Antenna Systems in Communication Satellites" by Matthews et al., Conference: 1979 IEEE MTT-S International Microwave Symposium Digest, Orlando, FL., U.S.A., Apr. 30–May 2, 1979.

"Japanese Broadcast Satellite" by Ohtake et al., Microwave Journal, vol. 20, No. 9, Sep., 1977, pp. 53–55.

"U.S. Broadcast Satellites" by Braham, pp. 49–52, 63, Microwave Journal, vol. 21, No. 1, Jan., 1978.

"General Purpose Packet Satellite Networks" by Jacobs et al., pp. 1448–1467 Proc. of the IEEE, vol. 66, No. 11, Nov. 1978.

"Methods for Achieving High–Capacity Universal Service Satellites" by Reudnink et al., pp. 8.2.1–8.2.6, NTC Conference Record, Birmingham, Ala., vol. 1, Dec. 3–6, 1978.

*Primary Examiner*—Douglas W. Olms
*Attorney, Agent, or Firm*—Erwin W. Pfeifle

[57] ABSTRACT

The present invention relates to a point-to-multipoint or broadcast TDMA or FDMA satellite arrangement wherein each up-link message unit is intended for reception at one or more geographically dispersed remote receiving sites within a wide service area. In one arrangement of a TDMA or FDMA satellite, the up-link message units are received and each message unit is directed to a transponder and to one or more down-link antenna ports for concurrent transmission to each of the destinations receiving sites for such message. An alternative TDMA satellite arrangement provides for each up-link message unit to be temporarily stored during the receiving frame period and then transmitted in accordance with a predetermined frame format during the appropriate time segments of the subsequent frame period to all of the destinational receiving sites. A technique for providing such predetermined frame format is also disclosed.

10 Claims, 10 Drawing Figures

FIG. 8

$$\underline{\underline{R}} = \begin{matrix} & \text{DESTINATIONS} \\ & \begin{matrix} 1 & 2 & 3 & 4 & 5 & 6 \end{matrix} \\ \begin{matrix} \\ \\ \\ \\ \end{matrix} & \begin{bmatrix} 1 & 1 & 1 & 1 & 0 & 0 \\ 1 & 0 & 1 & 0 & 1 & 0 \\ 1 & 0 & 0 & 0 & 0 & 0 \\ 1 & 1 & 1 & 0 & 0 & 1 \end{bmatrix} \begin{matrix} 1 \\ 2 \\ 3 \\ 4 \end{matrix} \end{matrix} \bigg\} \text{PROGRAM}$$

COLUMN SUM $\underline{\underline{R}}$ = 4, 2, 3, 1, 1, 1

FIG. 9

$$\begin{bmatrix} \text{④}, 2, \text{③}, 1, 1, 1 \end{bmatrix} \quad \begin{bmatrix} 0, 0, 0, 0, \text{①}, \text{①} \end{bmatrix}$$
$$\Downarrow \qquad\qquad\qquad \Uparrow$$
$$\begin{bmatrix} \text{③}, 2, \text{②}, 1, 1, 1 \end{bmatrix} \quad \begin{bmatrix} 0, \text{①}, 0, \text{①}, 1, 1 \end{bmatrix}$$
$$\Downarrow \qquad\qquad\qquad \Uparrow$$
$$\begin{bmatrix} \text{②}, 2, \text{①}, 1, 1, 1 \end{bmatrix} \Rightarrow \begin{bmatrix} \text{①}, \text{②}, 0, 1, 1, 1 \end{bmatrix}$$

FIG. 10

TRANSPONDER $84_1$

| 1 | 2 | 3 | 4 | 4 | 2 | PROGRAM |
|---|---|---|---|---|---|---|
| 1 | 1 | 1 | 1 | 2 | 5 | DESTINATION |

TRANSPONDER $84_2$

| 2 | 1 | 4 | 1 | 1 | 4 | PROGRAM |
|---|---|---|---|---|---|---|
| 3 | 3 | 3 | 2 | 4 | 6 | DESTINATION |

BROADCAST TYPE SATELLITE COMMUNICATION SYSTEMS

BACKGROUND OF THE INVENTION

1. Field of the Invention

The present invention relates to a broadcast type satellite communication system, and, more particularly, to broadcast or point-to-multipoint satellite communication systems using a multiple fixed or scanning spot beam digital broadcast satellite operating in the time-division or frequency-division mode and employing on-board regeneration which provides a minimum power realization.

2. Description of the Prior Art

Communication satellite services generally fall into one of two broad categories: (a) fixed point-to-point, and (b) point-to-multipoint or broadcast. Fixed point-to-point service is characterized by interconnections between user pairs, that is, each message originating at a given ground station of the network is intended for reception only by one other ground station of the network. High capacity digital satellite systems employing multiple spot beam antennas and reusing the frequency band among all beams have been considered for such services, and Time Division Multiple Access (TDMA) techniques in conjunction with on-board beam switching provides for complete interconnection among beams. For fixed point-to-point service, these techniques minimize the radio-frequency (r.f.) power requirements both at the ground and on board the satellite since the high gain spot beam satellite antenna concentrates the radiation pattern between user pairs rather than radiating information over a broader region where reception is unintended. Moreover, since the individual beams are spatially isolated, the frequency band can be reused among the beams, thereby increasing the transmission capacity relative to wide area coverage systems. Extensions of these techniques to include a scanning spot beam satellite antenna, and multiple scanning spot beams have also been devised. In this regard see, for example, U.S. Pat. No. 4,188,578 issued to D. O. Reudink et al. on Feb. 12, 1980 and the article "Methods for Achieving High-Capacity Universal Service Satellites" by D. O. Reudink et al. in the *NTC Conference Record*, Birmingham, Ala., Dec. 3-6, 1978, Vol. 1 at pages 8.2.1–8.2.6.

By contrast, broadcast service is multidestinational in nature, that is, messages originating at some given ground station are intended for reception at a large number of ground stations geographically dispersed over some wide service area. Broadcast service might be used for distribution of television programming, video conferencing, or multipoint electronic mail. Typically, most ground stations of the network have an interest in receiving only a small percentage of the total number of up-link messages.

Satellites employing wide area coverage antenna patterns are often considered as candidates for broadcast networks since all receiving terminals are within the field of view of the antenna. The satellite, then, simply amplifies the arriving up-link signals and retransmits these on the down-link; each receiving terminal extracts those messages of interest, ignoring the remainder. In this regard see, for example, the article "Japanese Broadcast Satellite" by T. Ohtake et al. in the *Microwave Journal*, Vol. 20, No. 9, September, 1977, at pages 53–55. Such systems, however, do not provide the flexibility to efficiently accommodate dynamically varying broadcast traffic demands. For example, consider the distribution of network television programming via an area coverage broadcast satellite. The required number of transponders is dictated by the peak programming demand; when fewer simultaneous programs are to be distributed, a sizeable block of transponder resources are unused. Furthermore, the use of an area coverage antenna implies indiscriminate radiation of all messages over the entire service region regardless of intended destinations; the low antenna gain must therefore be compensated by allocating more r.f. power to each transponder. Finally, the total number of simultaneous programs that can be accommodated is limited to that provided by reusing the frequency band once in the orthogonal polarization.

The problem remaining in the prior art is to provide a broadcast satellite which can increase the flexibility and reduce the radiated power requirements over present type prior art broadcast satellites.

SUMMARY OF THE INVENTION

The foregoing problem has been solved in accordance with the present invention which relates to broadcast type satellite communication systems and, more particularly, to broadcast or point-to-multipoint fixed or scanning spot beam digital broadcast satellites operating in the time-division or frequency-division mode and employing on-board regeneration which produces a minimum power realization.

It is an aspect of the present invention to provide a broadcast satellite operating in either a time-division or a frequency-division mode which is capable of receiving a plurality of separate transmission channels either sequentially during a frame period when operating in the time-division mode or concurrently when operating in the frequency-division mode, and, after passing each transmission channel through a transponder, concurrently transmitting the individual channel information in separate beams to each of the destined ground areas.

It is another aspect of the present invention to provide a broadcast satellite capable of (a) receiving information transmitted in each of a plurality of M multidestinational separate transmission channels and in a time-division mode during a frame period, and (b) storing the information associated with each of the multidestinational channels. During each subframe of a plurality of n subframes making up a frame period, each of a plurality of Q multiplexing means directs information from one of the stored plurality of M channels through a separate transmitter to an antenna means which directs the Q transmissions in separate beams to Q of the N remote and spaced-apart destinational receiving sites, where $M>1$. During a frame period each of the M multidestinational channels are sent in a predetermined sequence to all of the proper remote receiving sites.

It is still another aspect of the present invention to provide a technique for providing time slot assignments where the broadcast satellite uses a time-division mode of operation in accordance with the hereinabove paragraph and involves on-board bit regeneration and temporary storage prior to down-link redistribution to compensate for the difference between up-link and down-link data rates.

Other and further aspects of the present invention will become apparent during the course of the following description and by reference to the accompanying drawings.

BRIEF DESCRIPTION OF THE DRAWING

Referring now to the drawings, in which like numerals represent like parts in the several views:

FIG. 8 illustrates an exemplary M×N receive matrix in accordance with Equation (1) for the exemplary arrangement of FIG. 7;

FIG. 9 is an illustrative reduction of the 4×6 traffic matrix of FIG. 8 in accordance with the present invention; and FIG. 10 is a TDMA frame assignment sequence for the exemplary reduction of FIG. 9 in accordance with the present invention.

DETAILED DESCRIPTION

Figure 1:
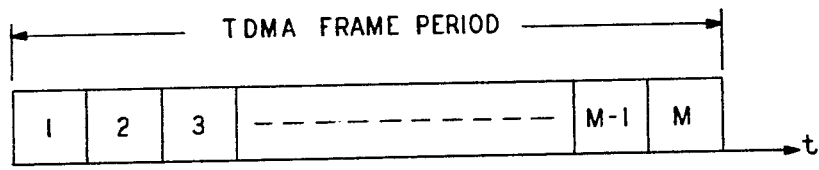
FIG. 1 illustrates a typical known time division multiple access (TDMA) frame format for handling traffic which is not greater than the capacity of a single transponder.

Broadcast satellites are typically characterized by a relatively small number of up-link transmission source nodes and a large number of down-link destination nodes. For the up-link, of course, the number of ground stations equipped with transmit capability may be quite large, but only a small subset actually transmit at any given time. The total up-link data rate, as measured by the sum of the rates for each source, is typically much smaller than the down-link rate as measured by the sum of the rates for each destination. Because of the disparity between the up- and down-link rates, it is convenient to treat the two separately.

In regard to the down-link, each down-link message is a multiple of some basic minimum message unit and these message units can be numbered, for example, from 1 to M. When used for television broadcasting, for example, each message unit might be a television channel. When applying the present invention to broadcasting in the United States, for example, the United States is divided into N spot beam footprints which completely span the region occupied by the receiving sites or terminals. Stated differently, each point in the United States is within the 3 dB contour of some spot beam. The aperture of the satellite antenna determines both the beamwidth and the number N of spot beam footprints required. As a result thereof, an M×N receive matrix $\underline{R}$ can be constructed:

$$\underline{R} = \begin{bmatrix} r_{1,1} & r_{1,2} & \cdots & r_{1,N} \\ r_{2,1} & r_{2,2} & \cdots & r_{2,N} \\ \vdots & & & \\ r_{M,1} & r_{M,2} & \cdots & r_{M,N} \end{bmatrix}, \tag{1}$$

where element $r_{i,j} = 1$ if message unit i is to be received by a ground station within the jth spot beam footprint and is zero otherwise.

From matrix (1), the minimum required down-link power is determined as follows. Since all message units are of the same bit rate, each message unit requires, for example, P watts of power to be received in some given spot beam footprint. Clearly, P varies inversely with the spot beam antenna gain. Therefore, the total required down-link power $P_D$ is the product of P and the number of message destinations in matrix (1), i.e., $$P_D = P \sum_{i=1}^{M} \sum_{j=1}^{N} r_{i,j}. \tag{2}$$

Having determined the minimum required down-link power, it is to be noted that within this constraint, matrix (1) can be modified upon demand. More particularly, the message-destination matrix can be modified with considerable flexibility, provided only that Equation (2) is not violated. Thus, additional message units or channels can readily be added for broadcast on a regional basis, provided the message units being preempted over these regions are removed from the appropriate elements of the matrix.

The up-link is to be treated similarly, except that here interest is in the M×N message-source matrix $\underline{S}$, given by $$\underline{S} = \begin{bmatrix} s_{1,1} & s_{1,2} & \cdots s_{1,N} \\ s_{2,1} & s_{2,2} & \cdots s_{2,N} \\ \vdots & & \\ s_{M,1} & s_{M,2} & \cdots s_{M,N} \end{bmatrix}, \tag{3}$$

where $s_{i,j} = 1$ if message unit i originates in spot beam j and is zero otherwise. Since each message can originate in only one spot beam footprint, each row of matrix (3) contains only one nonzero entry.

The required down-link transponder capacity, D, is found as follows. Let each message unit require C time units of transponder capacity. Then $$D = C \sum_{i=1}^{M} \sum_{j=1}^{N} r_{i,j} \tag{4}$$

The quantity D is a measure of the required down-link bandwidth, which affects the required number of transponders and the number of frequency reuses. However, some down-link message units may be destined for several spot beam regions. The "distinct" capacity required is, in fact, equal to th required up-link capacity U, given by:

$$U = C \sum_{i=1}^{M} \sum_{j=1}^{N} s_{i,j} = MC. \tag{5}$$

Figure 3:
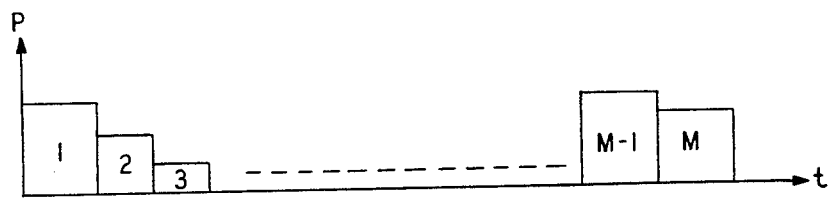
FIG. 3 is a bargraph of a typical radiated power vs. time sequence for the broadcast satellite of FIG. 2.
Figure 2:
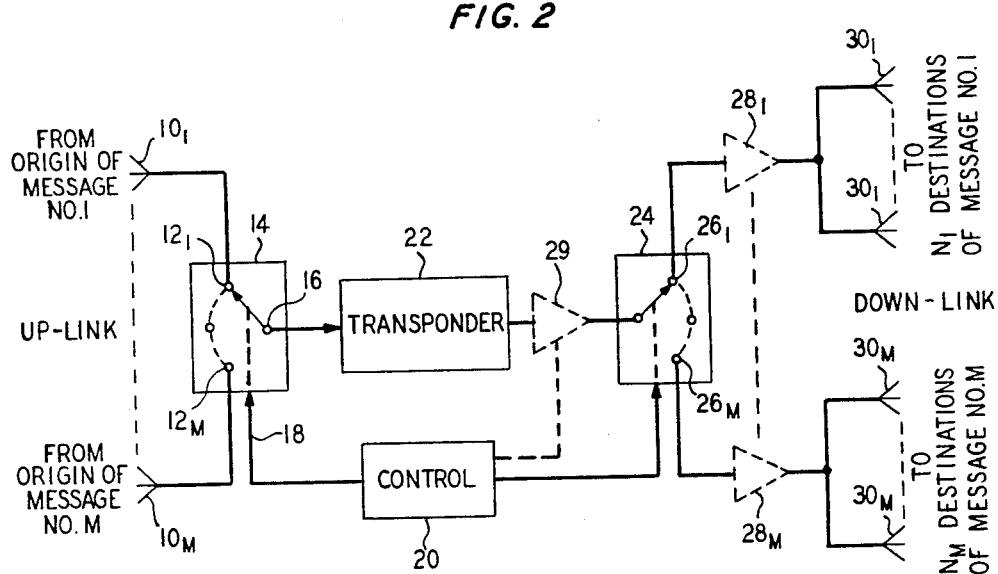
FIG. 2 illustrates a block diagram of a TDMA broadcast satellite in accordance with the present invention where the traffic therethrough is not greater than the capacity of a single transponder.

FIGS. 1-3 relate to a broadcast satellite in accordance with one embodiment of the present invention where the required up-link capacity U is less than or equal to the capacity of a single satellite transponder, or a pair of transponders if both polarizations are used, operating in the time-division mode. With such constraints, a single transponder of variable instantaneous down-link power can provide the minimum average power realization. The frame interval for use in the time-division mode is shown in FIG. 1 and is divided, for exemplary purposes only, into M time segments where each segment is used for the transmission related to a different one of the M programs or message units.

FIG. 2 illustrates a block diagram of a typical TDMA broadcast satellite in accordance with one embodiment of the present invention where the required up-link capacity U is less than or equal to the capacity of a single transponder. The broadcast satellite is shown in FIG. 2 as comprising a plurality of M up-link receiving antenna ports $10_1$-$10_M$ with each port being directed to receive a separate one of the M messages received during a frame period of FIG. 1 from associated ground stations disposed within the viewing area of the receive antenna. For example, antenna port $10_1$ is directed toward the proper remote ground station for receiving message 1 during the first time segment of the frame period. Similarly, antenna ports $10_2$-$10_M$ are directed towards the proper remote ground stations for receiving messages 2-M, respectively, during respective time segments 2-M of the frame period of FIG. 1.

Receiving antenna ports $10_1$-$10_M$ are connected to input terminals $12_1$-$12_M$, respectively, of a selective switching means 14, the switching means 14 sequentially connecting the input terminals $12_1$-$12_M$ to an output terminal 16 thereof in response to timing signals received over lead 18 from a synchronized control circuit 20. Control circuit 20 is synchronized, by any suitable technique, to cause switching means 14 to sequentially connect the proper input terminal $12_1$-$12_M$ to the output terminal 16 in synchronism with the arrival of each one of the message units 1-M during each of the associated time segments 1-M of the frame format of FIG. 1.

The sequential messages from switching means 14 are transmitted through a transponder 22 and applied as an input to a second selective switching means 24. Switching means 24 is responsive to timing signals from timing circuit 20 to direct the sequentially received message units 1-M to optional amplifiers $28_1$-$28_M$, respectively, during each of the respective time segments 1-M of the frame format of FIG. 1. Amplifiers $28_1$-$28_M$ are described as optional in that they may be replaced by a variable power amplifier 29 disposed between transponder 22 and switching means 24. After appropriate amplification, each message unit is applied concurrently to one or more downlink antenna ports $30_1$, ..., or $30_M$ for transmission in separate down-link spot beams to the one or more ground stations, respectively, destined to receive that message. More particularly, the output from optional amplifier $28_1$ is applied to a plurality of antenna ports $30_1$ during time segment 1 of the frame format of FIG. 1, each antenna port $30_1$ transmitting message 1 in a separate down-link spot beam to a separate one of the ground stations which is to receive message 1. Similarly, each message unit 2-M is applied to a separate optional amplifier $28_2$-$28_M$, respectively, the output of the associated amplifier being directed to a separate plurality of respective antenna ports $30_2$-$30_M$ for transmission to the destination ground stations.

In operation, then, during the first time slot, the up-link to the transponder 22 is connected to a spot beam antenna port $10_1$ which covers the originating site of the first message unit. Simultaneously, the down-link is connected to antenna ports $30_1$ which form multiple spot beams such that all spot beam footprints to receive the first message unit are covered. The optional power amplifier $28_1$ associated with this first down-link antenna port is energized only for the first time slot of the frame and, during this interval, the power supplied is equal to $PN_1$, where $N_1$ is the number of spot beam footprints to be illuminated with the first message unit. Similarly, during the kth time slot of the frame, the up-link to the transponder 22 is connected to the kth spot beam antenna port $10_k$ which covers the originating site of the kth message unit; the down-link being simultaneously connected to the kth down-link ports $30_k$ which form simultaneous spot beams over those areas wishing to receive the kth message unit. The optional power amplifier $28_k$ for that port is energized during that kth time slot and supplies $PN_k$ watts where $N_k$ is the number of footprints illuminated. Following this procedure, the instantaneous radiated power might appear as shown in FIG. 3. The average radiated power for this approach is given by Equation (2). Where variable power amplifier 29 is used instead of power amplifiers $28_1$-$28_M$, appropriate control signals from control unit 20 can be used to alter the power of amplifier 29 to provide the necessary instantaneous power shown in FIG. 3 during each of the time slots 1-M.

It is noted that with this approach, all up-link antenna ports need not be distinct, i.e., a single antenna port suffices to serve all message units originating within the coverage area. Similarly, all down-link antenna ports might not be distinct. It is to be understood that the switches 14 and 24 are shown for illustrative purposes only and that the functions provided by these switches could equally well be provided by up- and down-link phased array antennas, with appropriately phased power being applied to each down-link antenna element.

Figure 4:
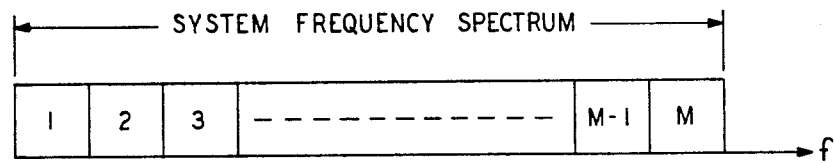
FIG. 4 illustrates a typical known frequency division multiple access (FDMA) format where the traffic through a satellite does not exceed that which can be accommodated in the allocated spectral band.
Figure 6:
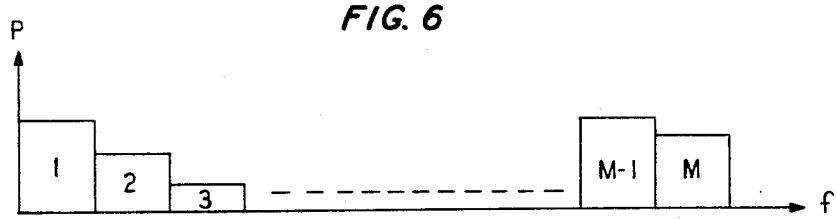
FIG. 6 is a bargraph of a typical radicated power vs. frequency result across the band of FIG. 4 for the broadcast satellite of FIG. 5.
Figure 5:
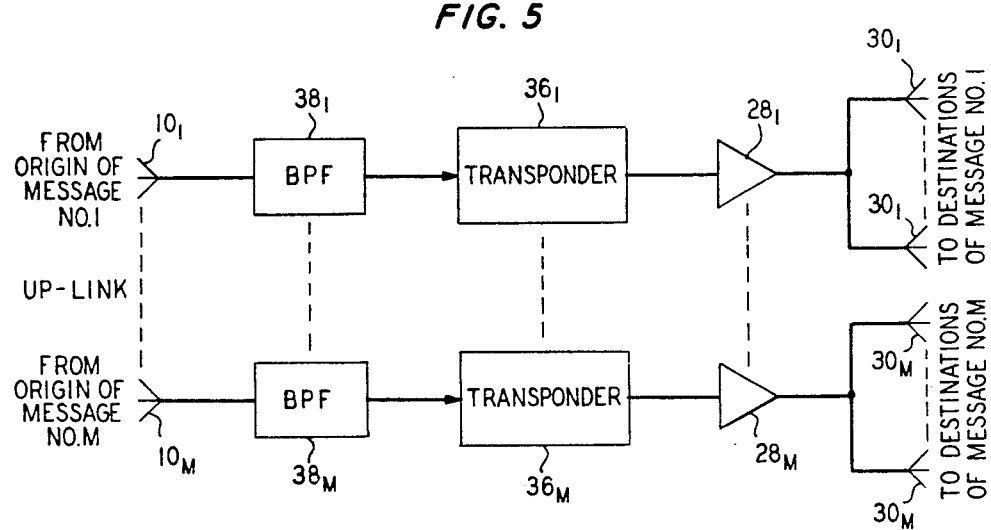
FIG. 5 illustrates a block diagram of a FDMA broadcast satellite in accordance with the present invention which uses the format of FIG. 4.

A dual system to the one just described for FIGS. 1-3 using frequency-division rather than time-division multiplexing is shown in FIGS. 4-6. There, the frequency spectrum is divided into M bands, as shown in FIG. 4. As shown in FIG. 5 each band 1-M is connected to a separate transponder $36_1$-$36_M$, respectively, through a separate respective up-link antenna port $10_1$-$10_M$ which covers the originating footprint of the corresponding message unit. A separate bandpass filter $38_1$-$38_M$ selects the appropriate band for each transponder $36_1$-$36_M$, respectively. The down-link side of each transponder $36_1$-$36_M$ contains a final power amplifier $28_1$-$28_M$, respectively, and the output signal therefrom is fed to respective antenna ports $30_1$-$30_M$ which cover the reception sites of their respective message units. Again, the power supplied by each amplifier $28_1$-$28_M$ varies with the number of footprints wishing to receive the message unit of the associated transponder $36_1$-$36_M$ and again, not all antenna ports are necessarily distinct. The power radiated across the band might appear as shown in FIG. 6. The total radiated power is given by Equation (2).

The arrangements of FIGS. 2 and 5, however, do provide two restrictions. First, neither can be applied if the total up-link data rate exceeds the transmission capability of one full bandwidth transponder or two transponders if the orthogonal polarization is employed. Under this constraint, frequency reuse is not required, and interference cannot occur because the various message units are transmitted either in different time slots or different frequency bands. If the up-link data rate were sufficiently high so as to require multiple transponders with frequency reuse, then interference among the down-link message units would result.

The second restriction concerns inflexibility to changing message unit-source and -destination matrices. A satellite designed by either approach to provide optimum resource allocation for some given traffic matrix cannot be changed as traffic patterns vary since this would require changing both the power allocation and the spot beam footprints served by each antenna port. The time-division approach has the additional disadvantage of requiring variable power over the frame.

Figure 7:
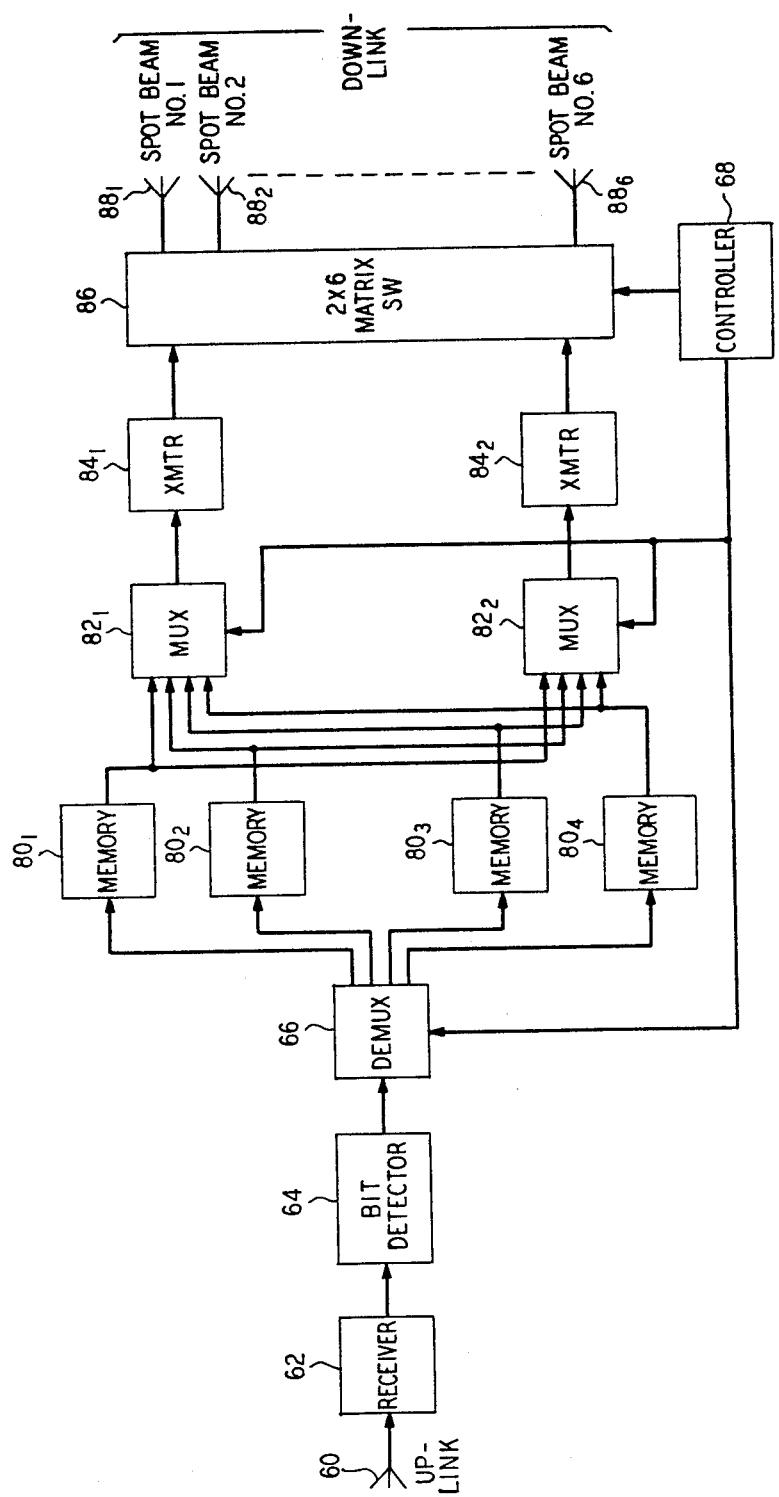
FIG. 7 illustrates an exemplary block diagram of an alternative TDMA broadcast satellite in accordance with the present invention for the case where M=4, Q=2 and N=K=6.

An alternative embodiment of the present invention is an exemplary TDMA satellite arrangement shown in FIG. 7 which overcomes the above-mentioned restrictions found with the arrangements of FIGS. 2 and 5. The satellite arrangement shown in FIG. 7 employs multiple independent scanning beams and frequency reuse and is exemplary since the arrangement shown is designed for the specific case where the number of programs of message units M to be distributed to multiple locations equals 4, the number of transponders $Q=2$, and the number of spotbeams N and the message unit capacity of a transponder K each equal 6. Such specific case will be used hereinafter for descriptive purposes only and it is to be understood that any value for M, Q, N and K can be substituted and the arrangement of FIG. 7 modified to accommodate the new values.

In FIG. 7, each of the 4 exemplary programs or message units M are sequentially received at the up-link antenna port 60 and applied to a receiver 62. Receiver 62 performs any amplification and demodulation necessary and the output thereof is applied as an input to a bit detector 64 which makes a decision whether a signal received during each successive predetermined time interval is a "0" or a "1" and generates an output bit stream representative of such decisions. The output bit stream from bit detector 64 is demultiplexed by demultiplexer 66 in response to timing signals from a controller 68 to write the information from each of programs 1-4 into memories $80_1$–$80_4$, respectively. In this manner, during a frame period each of the programs to be distributed to one or more destinations is received in the time-division mode and stored in a separate memory 80.

The output from each of memories $80_1$–$80_4$ forms a separate input to each of a pair of multiplexers $82_1$–$82_2$ which, under the direction of command signals from controller 68, choose a separate one of the 4 programs stored in memories $80_1$–$80_4$ during each time segment 1-M of the frame format for transmission to a destination ground station in accordance with a predetermined format stored in controller 68. The stored programs chosen from memories $80_1$–$80_4$ by multiplexers $82_1$–$82_2$ during each of the M time segments of a frame period are provided as an input to transmitters (or transponders) $84_1$–$84_2$, respectively, which provide the necessary modulation and amplification for transmission in a down-link beam. The output signal from transmitters $84_1$–$84_2$ form separate inputs to a 2×6 matrix switch 86 which is under the direction of a controller 68 and directs the signals from each of transmitters $84_1$–$84_2$ to a separate one of down-link antenna ports $88_1$–$88_6$ in accordance with the above-mentioned predetermined format. Each of the down-link antenna ports $88_1$–$88_6$ are used to form a separate down-link beam directed at an associated destination ground area or station. It is to be understood that in any description of the arrangement of FIG. 7, the functioning of matrix switch 68 and antenna ports $88_1$–$88_6$ can be performed by the substitution thereof by a phased array antenna and that the final power amplification may be performed by an amplifier preceding each element of the array antenna.

To illustrate the above-mentioned predetermined format for use by controller 68 to direct the synchronous operation of multiplexers $82_1$–$82_2$ and matrix switch 86, FIG. 8 shows a typical down-link program-destination matrix R, shown in Equation (1), where the 4 rows relate to the 4 programs M and the 6 columns relate to the 6 destinations N, FIG. 9 shows a reduction of the matrix of FIG. 8 in accordance with the present invention and FIG. 10 shows a time-division frame arrangement for each of the transmitters $84_1$–$84_2$ of FIG. 7. In such illustration, the up-link transmission capacity requirement is given by Equation (5), and the down-link by Equation (4). The up- and down-links are separated, and on-board regeneration and bit storage are required. As will become apparent, the on-board storage requirements are dictated by the length of the time-division frame.

Consider the down-link first. Each down-link transponder 84 employs time-division multiplexed transmissions and occupies the entire bandwidth. All transponders 84 are identical and radiate P watts each. The total available down-link capacity D is given by Equation (4) and consists of Q transponders, each of capacity K message units, such that $QK=D$. Each transponder is connected to a scanning spot beam antenna port since the number of footprints to be covered is much larger than the number of transponders.

Summing the columns of the down-link matrix R in FIG. 8, a column vector $$R = [R_1, R_2, \ldots, R_N] \tag{6}$$

is obtained whose elements $R_j$ represent the total capacity required into the jth spot beam footprint, i.e., $$R_j = \sum_{k=1}^{M} r_{j,k}.$$

It is necessary that no element $R_j$ exceeds the capacity K of a single transponder, or 2K if the dual polarization is used within a given spot beam footprint, or else interference between messages will result. Also, as already stated, the total down-link traffic cannot exceed the combined capacity of the transponders $84_1$–$84_2$. It will now be shown, by construction, that these are sufficient conditions as well for a minimum power down-link assignment of messages to transponder time slots. These requirements can be stated as follows:

$$\sum_{j=1}^{N} R_j = QK = D \tag{7}$$

$$R_j \leq K, j = 1, \ldots, N. \tag{8}$$

From (7) and (8), there must exist a D-tuple of non-vanishing elements of matrix $\underline{R}$ given by Equation (6)

which covers all the elements which are exactly equal to K. There can be no more than Q elements which equal K, or else (7) is violated. As shown in FIG. 9, the reduction is achieved by arbitrarily assigning one message or program unit from each element of the D-tuple to each of the Q transponders $84_1$ and $84_2$. Since the Q destinations for this initial assignment are distinct, the message or program units are transmitted on a nonconflicting basis.

Removing these message or program units from R, a reduced vector remains which can be defined as $$\underline{R}' = [R_1', \ldots, R_N'] \quad (9)$$

for which $$\sum_{j=1}^{N} R'_j = Q(K - 1) \quad (10)$$

$$R_j' \leq K - 1, j = 1, \ldots, N. \quad (11)$$

Furthermore, each transponder has K−1 units of unused capacity remaining. Hence, a D-tuple of $\underline{R}$ exists spanning all elements which equal K−1, and all message units can be iteratively assigned to transponders $84_1$ and $84_2$ by multiplexers $82_1$ and $82_2$ on a nonconflicting basis as shown in FIGS. 9 and 10.

The above assignment sequence allocates transponder time slots to spot beam footprints such that during each time slot, the transponders illuminate distinct spot beam footprints. Since this assignment is based upon the message unit-destination matrix (1), an exemplary matrix such as is shown in FIG. 8 will then be used to assign message units to each time slot. This requires that, for each time slot, the appropriate message units be available at the satellite for down-link broadcast. It is to be understood that the same message unit may be broadcast into different spot beam footprints during different time slots. Since the down-link data rate is much larger than that of the up-link, it is, in general, not possible to retransmit each up-link message unit each time it is needed. Thus, the up-link message units are detected and stored on board the satellite in program memories $80_1$–$80_4$ such that they are available for down-link broadcast when needed.

Consider now the up-link. Again, each transponder is of capacity K, and L transponders are needed such that LK=U, when U is given by Equation (5). Typically, L<<Q. Just as a time-division assignment was made for the down-link, a second assignment is made for the up-link. The entire up-link frame is stored at the satellite for each up-link receiver or transponder 62; the appropriate message units are then read out of memories $80_1$–$80_4$ to construct the next down-link frame.

To keep the on-board memory requirements at a minimum, the frame length should be made as short as practical, implying that message-unit packets are also short. However, short packet size conflicts with overhead efficiency since, for each packet, a noninformation-bearing preamble to enable carrier and clock recovery and various other housekeeping functions must be provided. Such overhead can be set arbitrarily at 10 percent. The preamble might be about 40 symbols to obtain good carrier and clock recovery, implying about a 440 symbol burst, of which 400 are information-bearing text. Assuming 4φ−PSK transmission, this amounts to 800 bits of information per burst. Thus, for each message unit, 800 bits must be buffered during each frame. Consider now that about 12 commercial TV channels, each of 44 Mbit/sec. data rate, can be transmitted by a 500 MHz digital transponder. Allowing polarization reuse, the system capacity for up-link transmission from a single source is 24 channels or message units. The total on-board buffer requirement is then 800×24=19.2 Kbits.

By construction, the system just described uses the available satellite resources with an efficiency of 100 percent, and the total required power $P_D$ is given by Equation (2). Furthermore, once designed, the system is quite flexible in that any message unit-destination matrix can be accommodated, provided only that constraints (7) and (8) are satisfied. Thus, as traffic patterns change, the up-link message units are dynamically reassigned to transponder time slots to satisfy the new message-destination requirements.

It is to be understood that the above-described embodiments are simply illustrative of the principles of the invention. Various other modifications and changes may be made by those skilled in the art which will embody the principles of the invention and fall within the spirit and scope thereof. For example, the arrangement of FIG. 7 can be expanded to include multiple up-link antenna ports $60_1$, receivers $62_1$, bit detectors 64 and demultiplexers 66 as separate input sources for M programs which are then stored in M memories $80_1$–$80_M$ in the manner shown. Similarly, where more than two transmitters 84 are required additional multiplexers 82 and input ports to matrix switch 86 would be required and connected in the manner shown. Additionally, as programs and/or their destinational requirements change, the matrix of FIG. 8 can be updated and the time slot assignments reconfigured to accommodate such change. These reconfigured time slot assignments can then be transmitted via a telemetry channel (not shown in FIG. 7) for storage and use by controller 68.

I claim:

1. A radio repeater capable of providing point-to-multipoint distribution comprising:
    antenna means comprising at least one receiving antenna port ($10_1$–$10_M$, 60) capable of receiving information remotely transmitted in each of a plurality of M message unit signals during a predetermined time period; and
    Q amplifying means ($28_1$–$28_M$, 29, $84_1$–$84_2$) where Q≧1, characterized in that the repeater further comprises:
    means (14 and 24, $38_1$–$38_M$, $82_1$–$82_2$) capable of directing the information of each message unit signal initially received at the at least one receiving antenna port to one of the Q amplifying means on a noninterfering basis with other message unit signals and a predetermined number of times during the predetermined time period; and
    the antenna means further comprises transmitting antenna ports ($30_1$–$30_M$, $88_1$–$88_M$) capable of transforming an output message unit signal from each of the Q amplifying means into at least one electromagnetic spot beam for radiation to at least one remote and spaced-apart receiving site destined to receive such message unit signal, such that during an interval corresponding to the predetermined time period at least one of the M initially received message unit signals is radiated in a plurality of sequential or concurrent spotbeams to a plurality of associated receiving sites.

2. A radio repeater according to claim 1 wherein the repeater operates within the time-division mode where each message unit signal is received in a different time segment of the predetermined time period characterized in that the value of Q and M are equal and the repeater further comprises:

a transponder (22) comprising an input and an output; and the directing means comprises a first switching means (14) capable of directing any message unit signal received at the at least one receiving antenna port of the antenna means to the input of the transponder, and a second switching means (24) capable of directing each message unit signal at the output of the transponder to an associated one of the Q amplifying means ($28_1$-$28M$) for subsequent transmission by the appropriate transmitting antenna ports ($30_1, \ldots, 30_M$) in concurrent spotbeams to the receiving sites destined to receive such message unit signal.

3. A radio repeater according to claim 1 characterized in that the repeater further comprises:

a transponder (22) comprising an input and an output; and the antenna means comprises Q transmitting antenna ports;

each of the Q amplifying means being coupled to a separate one of the Q transmitting antenna ports;

the directing means comprises a first switching means (14) capable of directing any message unit signal received at the at least one receiving antenna ports of the antenna means to the input of the transponder, and a second switching means (24) capable of directing each message unit signal at the output of the transponder to a separate one of the Q amplifying means for subsequent transmission by the associated one of the Q transmitting antenna ports in concurrent spotbeams to the receiving sites destined to receive such message unit signal; and the combination of the Q transmitting antenna ports, the Q amplifying means and the second switching means forming a transmitting phased array antenna.

4. A radio repeater according to claim 1 wherein the repeater operates with the frequency-division mode where each received message unit signal arrives concurrently with other message unit signals in a different frequency band of an overall system frequency spectrum characterized in that the value of Q and M are equal and the repeater further comprises:

a plurality of Q transponders, each transponder comprising an input and an output coupled to a separate one of the Q amplifying means; and the directing means ($38_1$-$38_M$) comprises a plurality of Q bandpass filters coupled at their inputs to the at least one receiving antenna port ($10_1$-$10_M$) of the antenna means, each filter being tuned to pass a frequency band signal associated with a separate one of the M concurrently received message until signals to a separate one of said transponders.

5. A radio repeater according to claim 2 or 4 characterized in that each of the Q amplifying means is capable of amplifying the associated message unit signal by an amount such that the radiated power in each of the associated transmitted beams is approximately equal to the radiated power in any of the other transmitted beams associated with the other message unit signals.

6. A radio repeater according to claim 1 wherein the repeater operates within the time-division mode characterized in that the repeater further comprises:

a plurality of M storage means (80), each storage means being capable of storing the information associated with a different one of the plurality of M message unit signals received during the predetermined time period; and the directing means comprises a first switching means (66) capable of directing each of the message unit signals received during said predetermined time period to the correct associated storage means, and a second switching means ($82_1$-$82_2$) capable of selectively switching the information stored in any of the plurality of M storage means to any of the Q amplifying means during each of a plurality of different time segments forming the predetermined time period in accordance with a predetermined transmitting frame sequence.

7. A radio repeater according to claim 6 characterized in that the repeater further comprises:

control means (68) capable of transmitting appropriate enable signals to both the first switching means (66) for causing the selective switching of each received message unit signal to the proper associated storage means, and the second switching means (82) for causing the proper selection of each message unit signal stored in the associated storage means for transmission to the associated amplifying means in accordance with the predetermined transmitting frame sequence.

8. A radio repeater according to claim 6 characterized in that the directing means further comprises third switching means (86) capable of selectively switching the output amplified message unit signals from each of the Q amplifying means during each time segment forming a frame period to the appropriate transmitting antenna ports ($88_1$-$88_M$) of the antenna means for transmission in a separate beam to the proper receiving site in accordance with the predetermined transmitting frame sequence.

9. A radio repeater according to claim 1 wherein the repeater operates within the time-division mode characterized in that the repeater further comprises:

a plurality of M storage means (80), each storage means being capable of storing the information associated with a different one of the plurality of M message unit signals received during a frame period; and the antenna means comprises Q transmitting antenna ports;

each of the Q amplifying means is coupled to a separate one of the Q transmitting antenna ports;

the directing means comprises a first switching means (66) capable of directing each of the message unit signals received during a frame period to the correct associated storage means, and a second switching means capable of selectively switching the information stored in any of the plurality of M storage means to the Q amplifying means during each of a plurality of different time segments forming a frame period in accordance with a predetermined transmitting frame sequence; and the combination of the Q transmitting antenna ports, the Q amplifying means and the second switching means forms a transmitting phased array antenna.

10. A radio repeater capable of providing point-to-multipoint distribution comprising:
antenna means comprising a receiving antenna port ($10_1$–$10_M$, 60) capable of receiving information remotely transmitted in a message unit signal during a portion of a predetermined time period; and
an amplifying means ($28_1$–$28_M$, 29, $84_1$–$84_2$)
characterized in that the repeater further comprises:
means (14 and 24, $38_1$–$38_M$, $82_1$–$82_2$) capable of directing the information of the message unit signal initially received at the receiving antenna port to the amplifying means at least once during an interval corresponding to the predetermined time period; and
the antenna means further comprises a transmitting antenna port ($30_1$–$30_M$, $88_1$–$88_M$) capable of transforming an output message unit signal from the amplifying means into a plurality of separate electromagnetic spot beams for radiation in a plurality of sequential or concurrent spotbeams to a predetermined plurality of remote and spaced-apart receiving sites destined to receive such message unit signal during said interval corresponding to the predetermined time period.

* * * * *

UNITED STATES PATENT AND TRADEMARK OFFICE
CERTIFICATE OF CORRECTION

PATENT NO. : 4,381,562
DATED : April 26, 1983
INVENTOR(S) : Anthony Acampora

It is certified that error appears in the above—identified patent and that said Letters Patent is hereby corrected as shown below:

Column 8, line 42, Eq. (6), "R=" should read --$\underline{R}$=--.
Column 11, line 60, "until" should read --unit--.

Signed and Sealed this

Fifteenth Day of May 1984

[SEAL]

Attest:

GERALD J. MOSSINGHOFF

Attesting Officer   Commissioner of Patents and Trademarks